July 3, 1956
W. A. McMULLEN
2,752,596
STAPLE MACHINE FOR JOINING INSULATED
ELECTRICAL CONDUCTORS
Filed March 29, 1955
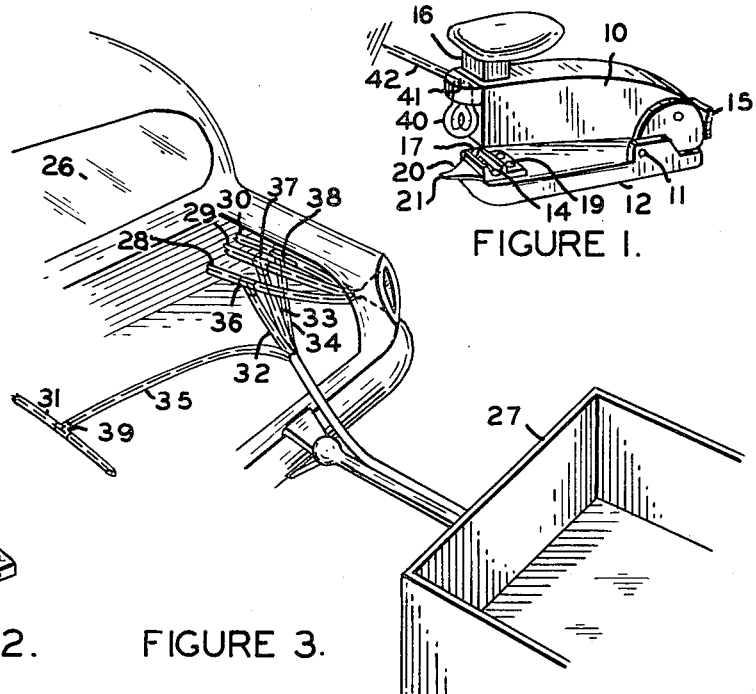
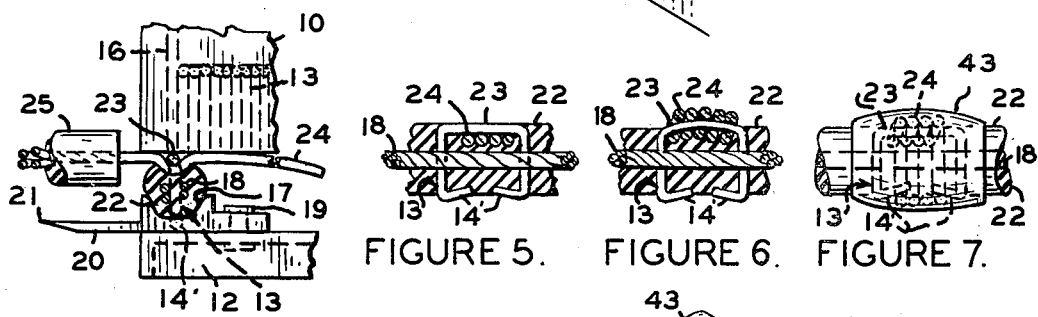
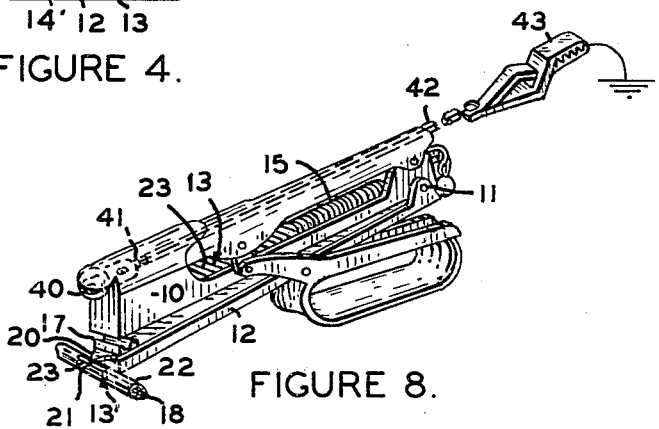
INVENTOR
WILLIAM A. McMULLEN
BY Marvin B. Davis
ATTORNEY

United States Patent Office 2,752,596
Patented July 3, 1956

2,752,596

STAPLE MACHINE FOR JOINING INSULATED ELECTRICAL CONDUCTORS

William A. McMullen, Kansas City, Mo.

Application March 29, 1955, Serial No. 497,591

2 Claims. (Cl. 1—49)

This invention relates to a staple machine having the improved addition of a centering die for driving staples between multiple strand electrical wires confined in a common insulator, the new use of the staples being for making electrical voltage connections between like signal light wires in a motor car and a trailer coupled thereto.

The trailer rental business of current practice is confronted with a difficult problem of making connections between a motor car and a trailer of signal light wires such as tail light, stop light; and turn lights when required in some States. The trailer cable of wires now extends from the lights on the rear of the trailer to beyond the front end of the trailer tongue and into the rear portion of the motor car. The trailer light wires must be tested by the continuity method with signal light wires in the motor car for a like performance from the operation of the signal lights in the motor car. The wire connections may be required to be made at any time of day or night and often require considerable and valuable time of the service man. The wire connections may be first made by the trailer service man but subsequent numerous connections may be required by the renter of the trailer. The motor car owner strenuously objects to the heretofore practice of cutting the insulation from the regular car signal light wires for splice work which requires the bare wires to be wrapped with tape after the use of the trailer has been discontinued.

An advantage of the improved invention is in the driving of both ends of a wire staple through the insulation and between multiple electrical wires of a conductor, curling the ends of the wire staple against the insulation and using the bridge of the wire staple for making an electrical voltage contact with another electrical conductor.

A still further advantage of the improved invention is that the wire staples may be easily and quickly extracted from the wires and insulation thereof after they have served the purpose and all of the original insulation remains on the strands of electrical wires.

A still further advantage of the improved invention is in the fastening of the bared end portion of a wire conductor to an insulated multiple wire strand conductor by placing the bared end portion of the wire over the insulation of the second mentioned conductor and driving a wire staple over the bared wire and between the multiple wire strands of the second conductor whereby the remaining bared end portion of the wire may be wrapped around the insulation of the second conductor and over the bridge of the wire staple to make an electrical contact with the second electrical conductor.

With these advantages in view the object of the improved invention will be more fully understood from the drawing, the specification, and the claims appended.

In the drawing:

Figure 1 is a perspective view of an ordinary type staple machine with the improved centering tool for the insulated wire conductor operatively attached. An improved extractor of staples is projected from the front of the centering tool and a test light is operatively secured to the staple machine.

Figure 2 is a perspective view illustrating the centering tool for the insulated wire conductor with the extractor projected therefrom.

Figure 3 is a perspective view of a portion of a motor car coupled to a portion of a trailer illustrating the insulated signal light wires of the trailer operatively connected to the insulated signal light wires of the motor car.

Figure 4 is an enlarged fragmentary side view of a staple machine with the improved centering tool operatively secured thereto. A section of an insulated electrical conductor is illustrated with the bared end portion of a second insulated electrical conductor extended thereover. A staple is illustrated with the wire end portions thereof driven through the insulation and between the wire strands of the first mentioned electrical conductor and curled against the insulation thereof. The bridge of the wire staple clamps the bared end portion of the electrical conductor against the insulation of the first mentioned electrical conductor.

Figure 5 is an enlarged view of a short length of a signal light wire with the insulation broken away to illustrate the staple having the ends thereof driven through the insulation, between wire strands; and the end portions of the staple being curled against the insulation.

Figure 6 is a view similar to Figure 5 except the bridge of the staple has been arched from the insulation with the use of the extractor tool and the bared end portion of an insulated signal light wire is wound around the bridge of the staple for one form of electrical voltage connection.

Figure 7 is a view similar to Figure 6 except the bared end portion of one insulated wire is wound around the outside of the bridge and the insulation of a second electrical wire conductor.

Figure 8 is a perspective view representing another type of staple machine with the improved centering tool, extractor, and test light secured thereto.

Staple machines are old in the art for clipping papers together, are well known in several designs and are used in the great majority of offices throughout the country. All of the staple machines have basic parts such as an upper lever portion 10 pivoted at 11 to a lower lever portion 12, a strip of a plurality of attached staples 13 fed into the chamber of the upper lever 10, a curling die 14 secured to the lower lever 12 to register with the end staple farthest from the spring feed device 15, and a means 16 to drive the ends of the staple through the papers and curl the end portions 14' of the staple 13 on the curling die 14.

One feature of my invention is in the improved centering die 17 having a groove therein for centering the longitudinal center of the insulated signal light wire conductor 18 for driving both ends 14' of the staple 13 therethrough. The centering die 17 is preferably secured by solder or rivets 19 to the lower lever portion 12. The centering die 17 has a V shape groove therein and is elongated sufficiently to protect the insulation on the multiple strand wire conductor 18 against damage when the staple 13 has the ends 14' driven through the insulation 22 and between the multiple wires 18 therein. The V shape groove in the centering die 17 is elongated transversely to the longitudinal axis of the staple machine 10 for the reception of any short intermediate portion 18 of any long signal light wire insulated conductor.

Another feature of my invention is in the improved extractor 20 projected from the front of the centering die and extended sufficiently beyond the lower lever 12 with a knife-like end 21 to be inserted between the insulation 22 and bridge 23 of a staple 13. This extractor 20 is used for the removal of the staples after they have served the intended purpose. The extractor 20 has another important use of bending the bridge 23 upward into an arch shape above the insulation 22 for the insertion of a bared wire end portion 24 of another insulated wire conductor 25. A still further use of the extractor 20 is to hold it between the bridge 23 of staple 13 and the insulation of the connected wire for making voltage continuity checks to indicate if the proper signal light wires are contacted preparatory for making voltage electrical connections such as illustrated in Figures 6 and 7.

In Figure 4 a bared wire 24 is illustrated clamped between the bridge 23 and insulation 22. If the continuity check is indicated to be correct by the light 40 the remaining end portion 24 may be wound around the bridge 23 and insulation 22 and then wrapped with tape 43 for the completion of the joint as illustration in Figure 7.

However, if the first continuity trial is in error, the wire 24 is pulled free from the bridge 23 and insulation 22 leaving the staple 13 as shown in Figure 5. The extractor tool 20 is forced under the bridge 23 by the insertion of the knife-like end 21 to arch the bridge 23 and wrap the wire 24 around the bridge 23 as illustrated in Figure 6. The connection is then taped. Either type of joint or connection illustrated may be used as desired.

Figure 3 illustrates a motor car 26; coupled to a trailer 27; with the stop, tail and turn signal light insulated wires 28, 29, 30, and 31 respectively connected to like signal light insulated wires 32, 33, 34 and 35 from the trailer 27. All joints or connections are taped at 36, 37, 38 and 39.

A signal light 40 is operatively attached to the staple machine 10 to first indicate a current flow from the wire to be continuity tested and second to light the work when operating in darkness. One side of the light is electrically connected to the staple machine 10 and the opposite side of the light has the contact 41 connected to an insulated wire 42 and clip 43 for attachment to any metal or ground part of the body or trailer 27 to indicate the continuity of current flow of electrical voltage or the source of trouble interrupting the flow of electricity.

What I claim as new and desire to secure by Letters Patent is:

1. A staple machine having a means for driving both ends of a staple through the insulation and between the multiple strands of an electrical voltage conductor for making electrical voltage connections between like signal light wires in a motor car and a trailer coupled thereto, comprising a centering die, said centering die being mounted on the staple machine, a groove being in said centering die located transverse to the longitudinal center of the staple machine so as to center an electrical voltage conductor in the insulation thereof with both ends of the staple, curling die depressions, and said curling die depressions being located in the bottom longitudinal center of the groove and registering with the means for driving both ends of the staple through the insulation and between the multiple strands of an electrical conductor.

2. A staple machine for joining insulated electrical conductors to make an electrical voltage contact therebetween having at least a pair of levers pivoted near one end thereof and a means for driving staples on the opposite end of one lever comprising: a centering die, said centering die having a V shape groove therein located transverse to the longitudinal center line of the pair of levers so as to center an electrical conductor in the insulation thereof, curling die depressions being in the bottom of the centering die located in the longitudinal center of the V shape groove, said centering die being secured on the opposite lever from the lever having the means for driving staples, and said curling die depressions and the V shape groove registering with the means for driving staples.

References Cited in the file of this patent

UNITED STATES PATENTS

| | | |
|---|---|---|
| 1,963,306 | Maynard | June 19, 1934 |
| 2,093,900 | Wilson | Sept. 21, 1937 |
| 2,675,989 | Vogel | Apr. 20, 1954 |
| 2,682,054 | Lindstrom | June 29, 1954 |

FOREIGN PATENTS

| | | |
|---|---|---|
| 81,750 | Norway | May 4, 1953 |